United States Patent [19]

Inaba et al.

[11] 4,383,941

[45] May 17, 1983

[54] CATALYST STRUCTURE INCLUDING GLASS FIBER PRODUCT

[75] Inventors: Hideya Inaba; Masayoshi Ichiki, both of Osaka, Japan

[73] Assignee: Hitachi Shipbuilding & Engineering Co., Ltd., Osaka, Japan

[21] Appl. No.: 316,050

[22] Filed: Oct. 28, 1981

[30] Foreign Application Priority Data

May 22, 1979 [JP] Japan .................................. 54-63633
May 22, 1979 [JP] Japan .................................. 54-63634

[51] Int. Cl.³ ............................................. B01J 35/06
[52] U.S. Cl. ................................................. 252/477 R
[58] Field of Search ..................... 252/477 R; 422/180

[56] References Cited

U.S. PATENT DOCUMENTS 3,870,530 3/1975 Roberts ........................... 252/474 X

*Primary Examiner*—W. J. Shine
*Attorney, Agent, or Firm*—Armstrong, Nikaido, Marmelstein & Kubovcik

[57] ABSTRACT

A catalyst structure comprises a shape retaining metal core of the desired shape, a particle holding layer attached to the core and made of a glass fiber product and catalyst particles held in the layer.

5 Claims, 8 Drawing Figures

CATALYST STRUCTURE INCLUDING GLASS FIBER PRODUCT

BACKGROUND OF THE INVENTION

The present invention relates to novel catalyst structures prepared with use of glass fiber products.

Granular catalysts 5 to 10 mm in size have been generally used for vapor-phase catalytic reaction systems. Such catalysts have been found empirically favorable with respect to minimizing pressure loss of the reactant gas in the catalyst layer and minimizing clogging of the catalyst layer and further from the viewpoint of economy. On the other hand, however, such granular catalysts do not permit gaseous reactants to diffuse into the catalyst effectively, that is, fail to permit a high rate of mass transfer. A great difference therefore occurs in the reactant concentration within the grains or pellets, with the result that the catalyst is low in the effectiveness factor defined by Thiele et al. Thus there is the likelihood that almost all the charge of catalyst is unable to function substantially effectively. The low catalyst effectiveness factor poses a serious problem with expensive noble metal catalysts and is very unfavorable economically even in the case of relatively inexpensive catalysts of metallic oxides in respect of the pressure loss of reactant gases, the size of the reactor, the selectivity of reaction, etc.

Generally catalysts for use in industries must fulfill the following requirements:
(1) High activity per unit weight of the catalyst.
(2) High activity per unit volume of the reactor.
(3) Small pressure loss of the reactant gases in the catalyst layer.
(4) High overall strength enabling the catalyst to fully withstand the impact of charging.
(5) High surface strength against the external forces to be exerted on the catalyst during use.
(6) Reduced variations in activity despite the lapse of time.
(7) Low cost.

The true activity of a catalyst, free from mass transfer resistance, per unit weight thereof is dependent on the composition of the catalyst, the structure of the crystals thereof, etc. and is inherent in the catalyst, but the actual activity varies with the grain size, the pore structure of the grain, the flow rate, i.e. linear velocity, of the reactant gas, etc. Generally the activity increases with decreasing grain size, increasing pore size, increasing pore volume and increasing flow rate of the reactant gas. Nevertheless, these factors contributing to the increase of activity are entirely in conflict with the requirments in respect of the reactant gas pressure loss and catalyst strength. Accordingly it is extremely difficult to fulfill all the foregoing requirements (1) to (7).

In order to satisfy the above requirements (1) to (7), several catalysts of the honeycomb type have been developed in recent years. These catalysts include those prepared by forming a paste from a catalytic component and a binder, extruding the paste into a honeycomb body and baking the body under suitable conditions, and those prepared by making a honeycomb structure from ceramics having no catalytic activity and depositing a catalytic component on the surface of the structure with a binder. With the former catalysts, there is the need to form a honeycomb body with a large wall thickness and to obtain a compacted baked body which is less amenable to the diffusion of reactant gases into the catalyst, in order to give the desired strength to the catalyst. It is therefore impossible to afford an improved catalyst effectiveness factor. Thus difficulties are encountered in improving both strength and activity at the same time. With the latter case, the tough ceramics honeycomb structure has ideal overall strength, fulfilling the requirement (4), but the use of the binder reduces the inherent activity of the catalyst. Further the layer of deposited catalytic component, which is made very thin to assure high surface strength (5) and high activity per unit weight (1), reduces the activity per unit volume of the reactor (2) and impairs the stability of reaction.

SUMMARY OF THE INVENTION

The main object of the present invention, which has been accomplished in view of the foregoing problems, is to provide novel catalyst structures which fulfill all the foregoing requirements (1) to (7) for industrial catalysts.

To fulfill this object, the present invention provides a catalyst structure comprising a shape retaining metal core of the desired shape, a particle holding layer attached to the core and made of a glass fiber product, and catalyst particles held in the layer. The glass fiber product forming the particle holding layer has a relatively large number of filament-to-filament interstices. The particle holding layer is externally covered with a layer for preventing release of the catalyst particles which is made of a glass fiber product having a relatively small number of filament-to-filament interstices.

DESCRIPTION OF THE PREFERRED EMBODIMENTS

Figure 1:
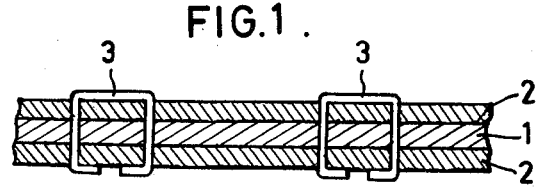
FIGS. 1 and 2 are sectional views showing sandwich-type catalyst structures.

The shape retaining core gives the desired overall strength to the catalyst structure. The core is in the shape of a flat plate or cylinder or is otherwise shaped suitably in accordance with the shape of the reactor. The core is made generally of steel.

Useful glass fiber products include nonwoven fabric, paper, mat, cloth and roving cloth of glass fibers. Throughout the specification and the appended claims, these terms mean the following.

The glass nonwoven fabric or glass paper is a planar web of glass filaments which are bonded to one another with an adhesive. The web is nonwoven fabric when long fibers are used, or is paper when short fibers are used.

The glass mat is prepared by forming a wad of specified thickness from rovings of glass filaments and making the wad into a mat.

The glass cloth is woven of yarns made by twisting from a multiplicity of glass filaments about 5 to 15$\mu$ in diameter. The weaving method is plain weave, twill weave, satin weave or the like.

The glass roving cloth is prepared by forming rovings from long glass fibers and weaving the rovings into a cloth without twisting.

All of these glass fiber products have filament-to-filament interstices which hold particles therein and permit diffusion of gaseous reactants therethrough. Thus these glass fiber products are useful as a component of the catalyst structure of the invention.

Since the glass nonwoven fabric, paper and mat each have a large number of filament-to-filament interstices, and further because component filaments thereof are easily shiftable relative to one another when subjected to an external force, they hold a large amount of catalyst particles therein. Accordingly these nonwoven fabric, paper and mat are well suited as glass fiber products for forming particle holding layers.

Fibers are incorporated into the glass cloth with increased tension and with a reduced number of filament-to-filament interstices, while the component filaments thereof are less shiftable relative to one another, therefore hold a smaller amount of catalyst particles therebetween, but will not permit the release of such particles therefrom when subjected, for example, to vibration. Accordingly the glass cloth is well suited as a glass fiber product for forming the layer for preventing release of particles.

The glass roving cloth as it is is similar to usual cloth, but when the roving cloth is subjected to a needling, brushing or like process to nap one side thereof, the napped surface is given suitable properties to hold particles. Accordingly when glass roving cloth having a napped surface is fitted to the core with the napped surface inside, the roving cloth serves as a glass fiber product having the functions of both the particle holding layer and the release preventing layer.

Useful catalyst particles are those not larger than 100 mesh. Especially particles in the range of 1 to 20μ are most preferable since they are easy to hold but difficult to release. Particles smaller than 1μ in size are somewhat easily releasable but are still satisfactorily usable under conditions free of strong mechanical vibration. Although particles exceeding 20μ in size have difficulty in entering filament-to-filament interstices of the layer, a sufficient amount of such particles can be held in the layer if the layer is pressed with rubber rollers an increased number of times as will be described later.

To cause a glass fiber product to hold catalyst particles, the product is immersed in a slurry comprising water or a suitable dispersing medium and catalyst particles and having a viscosity of 100 to 1000 cps. It is desirable to press the glass fiber product with rubber rollers in the slurry to force the slurry into the filament-to-filament interstices and thereby cause the product to hold the particles effectively. To squeeze an excess of the slurry from the glass fiber product, the product is then passed between rubber rollers under a pressure of 5 to 30 kg per unit length (m) of the rollers. The wet product is thereafter fitted to a shape retaining core and fixed thereto with fasteners. The glass fiber product thus fitted to the core is dried and, when desired, baked. The fiber product may be dried first and then attached to the core. In this case the product will release some amount of dust during handling, so that care should be taken to assure a good work environment.

In this way, a catalyst structure of this invention is obtained.

Figure 2:
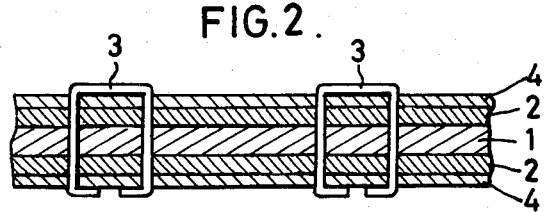
Figure 3:
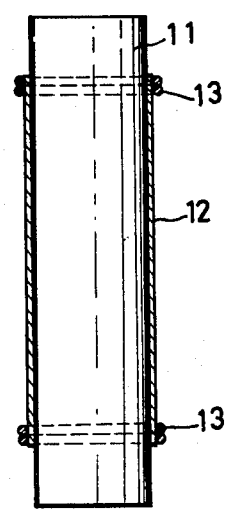
FIGS. 3 and 4 are front views partly in section and showing columnar catalyst structures.
Figure 4:
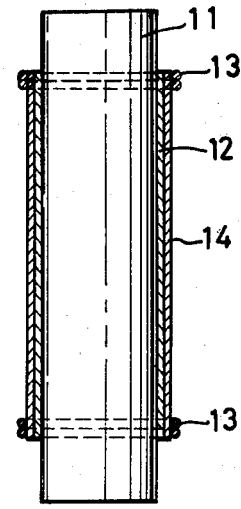

The catalyst structures of this invention can be in various forms. FIGS. 1 to 4 show typical examples. The catalyst structure shown in FIG. 1 is of the sandwich type. This drawing shows a metal core 1 in the form of a flat plate, a pair of planar particle holding layers 2 fitted to the opposite sides of the core 1, and fasteners 3 for fixing the layers 2 to the core 1. The catalyst structure shown in FIG. 2 further includes planar layers 4 for preventing release of catalyst particles which layers are fitted to the outer sides of the pair of particle holding layers. FIG. 3 shows a columnar catalyst structure comprising a cylindrical metal core 11, a particle holding layer 12 fitted around the core 11, and fasteners 13 for fixing the layer 12 to the core 11. FIG. 4 shows a catalyst structure further comprising a release preventing layer 14 covering the particle holding layer 12.

The catalyst structures thus constructed according to the invention have the following advantages.

The core, which is made of metal, gives high mechanical strength to the structure.

The particle holding layer, which is a glass fiber product, effectively holds a large amount of catalyst particles therein without using any binder, permits efficient diffusion of reactant gases through the interior of the structure with a reduced pressure loss and assures effective contact between the gases and the catalyst, enabling the catalyst to exhibit exceedingly high activity.

The materials of the structure are all inexpensive and easily available.

Accordingly the catalyst structures of the invention are ideal and fulfill all the foregoing requirements (1) to (7).

REFERENCE EXAMPLE 1

Different kinds of particulate materials were checked for differences in the amount of particles held by glass cloth.

A glass cloth was prepared which was 0.2 mm in thickness, 200 g/m$^2$ in weight and 19 yarns 25 mm in yarn density and which was woven of yarns each having one twist/25 mm and composed of 800 glass filaments 14 μm in diameter. Slurries of varying concentrations were prepared by adding water to 200- to 500-mesh particles of γ-alumina. A piece of the glass cloth was immersed in each of the slurries and pressed with rollers twice in the slurry. The piece of glass cloth thus impregnated with the slurry was dried at 100° C. for 1 hour and then baked or fired at 400° C. for 3 hours. The amount of particles held in each of the cloth pieces thus treated was measured.

The same procedure as above was repeated except that in place of the γ-alumina particles, silica-alumina particles or magnesia particles, the same as the γ-alumina particles in size, were used. The amount of particles held in each of the resulting cloth pieces was measured.

Figure 5:
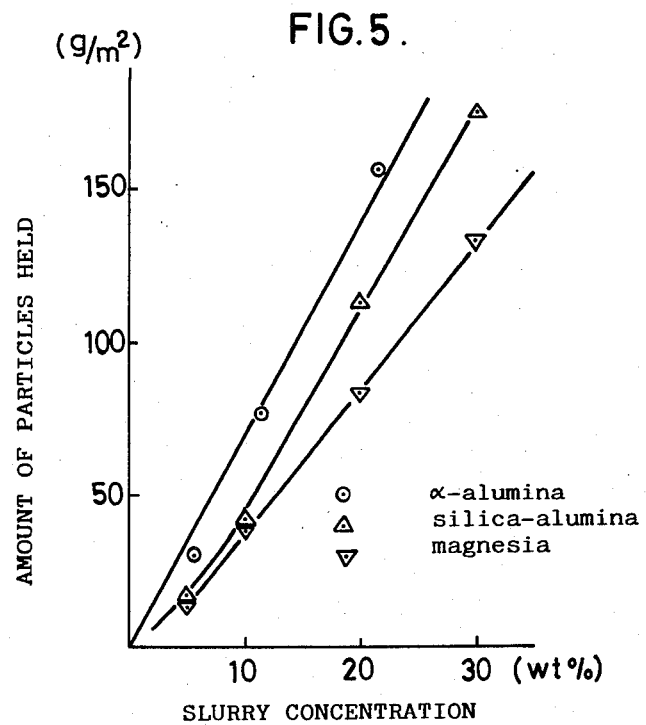
FIG. 5 is a graph showing the relation between the concentration of slurry and the amount of particles held by glass cloth.

The relation between the concentration of slurry and the amount of particles held in the glass cloth was determined for each kind of the particles. FIG. 5 is a graph showing the results. The graph reveals that the amount of each kind of particles increases with the increase of the slurry concentration.

REFERENCE EXAMPLE 2

Different kinds of glass fiber products were caused to hold particles therein and checked for differences in the amount of the particles.

The same glass cloth as used in Reference Example 1 was used as a glass fiber product. Water was added to 200- to 500-mesh magnesia particles to prepare a slurry having a concentration of 25% by weight. In the same manner as in Reference Example 1, the glass cloth was caused to hold magnesia particles, and the amount of particles held therein was measured.

The same procedure as above was repeated with the exception of using glass nonwoven fabric, mat or roving cloth napped on one side (by needling with 108 needles/cm²) instead of the glass cloth. The amount of magnesia particles held in each of the resulting glass fiber products was measured.

Table 1 shows the results.

TABLE 1

| Glass fiber product | | Particles | |
| --- | --- | --- | --- |
| Kind | Weight* (kg/m³) | Amount held** (kg/m³) | Amount held/weight of fiber product |
| Cloth | 1000 | 550 | 0.55 |
| Nonwoven fabric | 600 | 520 | 0.87 |
| Mat | 80 | 650 | 8.1 |
| Napped roving cloth | 470 | 620 | 1.32 |

*Weight of product per apparent unit volume of the product.
**Weight of particles per apparent unit volume of the fiber product.

EXAMPLE 1

The same glass cloth as used in Reference Example 1 was caused to hold magnesia particles in the same manner as in Reference Example 2, and was then attached to the opposite sides of a core of stainless steel plate, 35 mm × 50 mm × 1.5 mm, whereby a catalyst structure A of the sandwich type shown in FIG. 1 was prepared. Catalyst structures B, C and D were prepared in the same manner as above except that glass nonwoven fabric, glass mat or glass roving cloth napped on one side was used for the particle holding layers in place of the glass cloth. The roving cloth, the same as the one used in Reference Example 2, was attached to the steel plate with the napped surface inside.

EXAMPLE 2

Glass nonwoven fabric, mat and cloth were caused to hold magnesia particles therein in the same manner as in Reference Example 2. In the same manner as in Example 1, the glass nonwoven fabric was attached to a steel panel serving as the core to provide particle holding layers thereon. The glass cloth having magnesia particles held therein as above was placed over the holding layers to provide particle release preventing layers thereon, whereby a catalyst structure E of the same construction as shown in FIG. 2 was prepared. Further a catalyst structure F was prepared in the same manner as above except that the above glass mat having magnesia particles held therein was used in place of the glass nonwoven fabric to provide particle holding layers.

Table 2 shows the thicknesses and weights of the layers included in the catalyst structures prepared in the foregoing examples, and also the amounts of magnesia held in the layers.

TABLE 2

| Catalyst structure | Holding layer | | Preventing layer | | Thickness of layer* (mm) | Amount of magnesia (g/m²) |
| --- | --- | --- | --- | --- | --- | --- |
| | Fiber product | Weight (g/m²) | Fiber product | Weight (g/m²) | | |
| A | Cloth | 200 | — | — | 0.2 | 110 |
| B | Nonwoven fabric | 300 | — | — | 0.5 | 260 |
| C | Mat | 400 | — | — | 3.0 | 1900 |
| D | Napped roving cloth | 570 | — | — | 1.2 | 260 |
| E | Nonwoven fabric | 300 | Cloth | 200 | 0.8 | 380 |
| F | Mat | 400 | Cloth | 200 | 3.1 | 1900 |

*The thickness of the particle holding layer or the combined thickness of the holding layer and the particle release preventing layer.

REFERENCE EXAMPLE 3

The catalyst structures A to F were tested for abrasion resistance.

The catalyst structure A was fixed to the center of a 30-mesh metal screen having a diameter of 300 mm, 200 g of alumina balls with a diameter of 5 mm were placed into the screen, and the screen was vibrated on an automatic screening device (290 vibrations/min with an amplitude of 30 mm) for 4 hours. The amount of catalyst released was measured 1 hour, 2 hours and 4 hours after the start of the vibration to determine the amount of particles held in the structure. The same procedure as above was repeated for the catalyst structures B to F. Table 3 shows the results.

TABLE 3

| Catalyst structure | Amount of magnesia held (g/m²) | | | |
| --- | --- | --- | --- | --- |
| | Initial | In 1 hour | In 2 hours | In 4 hours |
| A | 110 | 90 | 86 | 84 |
| B | 260 | 180 | 110 | 40 |
| C | 1900 | 1100 | 620 | 120 |
| D | 260 | 235 | 228 | 225 |
| E | 380 | 345 | 330 | 321 |
| F | 1900 | 1550 | 1420 | 1400 |

Table 3 reveals that all the structures have great ability to hold particles.

REFERENCE EXAMPLE 4

The catalyst structures A to F were tested for resistance to vibrations.

The catalyst structure A was fixed to a 6-mesh metal screen and subjected to vibrations for 2 hours by a 50-Hz vibrator mounted on the structure A. The amount of particles released was measured 0.5 hour, 1 hour and 2 hours after the start of the vibration to determine the amount of particles held in the structure. The same procedure as above was repeated for the catalyst structures B to F. Table 4 shows the results.

TABLE 4

| Catalyst structure | Amount of magnesia held (g/m²) | | | |
| --- | --- | --- | --- | --- |
| | Initial | In 0.5 hour | In 1 hour | In 2 hours |
| A | 115 | 108 | 105 | 100 |
| B | 260 | 202 | 145 | 83 |
| C | 1830 | 1620 | 1400 | 1250 |
| D | 255 | 250 | 248 | 245 |
| E | 390 | 350 | 325 | 318 |
| F | 1900 | 1750 | 1720 | 1700 |

Table 4 reveals that all the catalyst structures have high resistance to vibrations.

EXAMPLE 3

A 300 g quantity of α-alumina particles not larger than 200 mesh in size were placed into a solution of 11.8 g of ammonium metavanadate, 3.8 g of ammonium molydate tetrahydrate and 8 g of oxalic acid in 130 g of water. The mixture was evaporated to dryness with stirring in a vacuum at a temperature of up to 60° C. and was further fired at 400° C. for 3 hours. The fired product was pulverized to obtain 200- to 500-mesh catalyst particles, to which water was added to prepare a slurry having a concentration of 25% by weight.

A strip of glass roving cloth napped on one side and having a thickness of 1.2 mm, width of 20 mm and weight of 570 g/m$^2$ was immersed in the slurry and pressed with rollers twice in the slurry. The strip thus impregnated with the slurry was fitted, with the nap inside, around a mild steel cylinder 18 mm in diameter and 80 mm in length and fastened thereto at its upper and lower portions. The strip was then dried at 100° C. for 1 hour and thereafter fired at 400° C. for 1 hour, whereby a columnar catalyst structure was prepared which had the construction shown in FIG. 3, with the roving cloth covering measuring 60 mm in length. The amount of particles held in the cloth layer was 240 g/m$^2$.

Activity test

Figure 6:
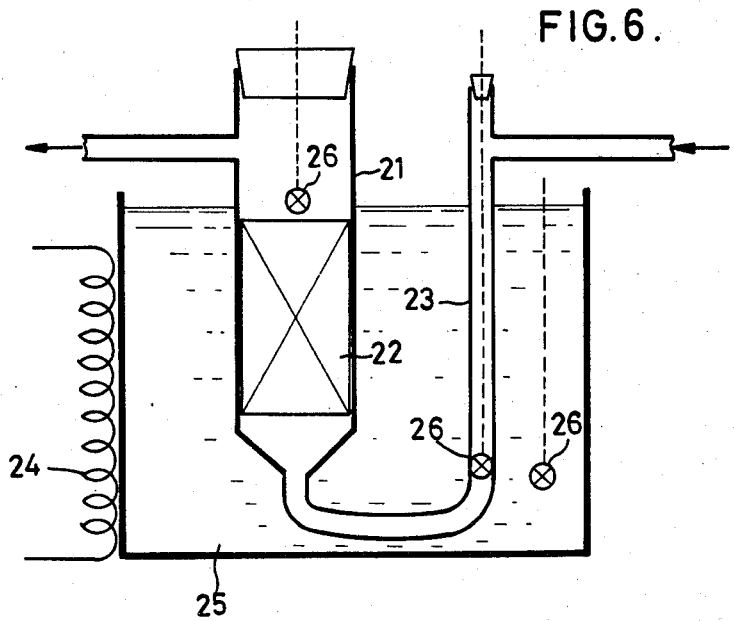
FIG. 6 is a view in vertical section showing a reactor.

The columnar catalyst structure (having about 0.9 g of catalyst particles held therein) indicated at 22 and prepared in Example 3 was placed into a large-diameter portion 21, 23 mm in inside diameter, of a reactor of quartz as seen in FIG. 6. The reactor was controlled to a predetermined reaction temperature. A benzene-air gaseous mixture (with a benzene concentration of 0.8 to 0.9%) was led into the reactor through a small-diameter portion 23 at a flow rate of 60 Nl/h, and the resulting outflow was collected from the upper end of the large-diameter portion 21 to measure the amount of maleic anhydride formed by the oxidation of benzene. The same procedure as above was repeated at varying reaction temperatures. The same procedure as above was further repeated at varying reaction temperatures with the exception of using a benzene-air mixture having an increased benzene concentration of 1.2 to 1.3%.

For comparison, 0.9 g of 6- to 8-mesh α-alumina 300 grains were admixed with 9 g of 6- to 8-mesh silica glass grains to obtain a catalyst in the form of small pellets, which was tested for activity under the same conditions as above. FIG. 6 further shows a heater 24, a molten salt bath 25 and a thermocouple 26.

Reactivities and selectivities were calculated from the above measurements at each of the reaction temperatures according to the following equations.

$$\text{Reactivity} = \left(1 - \frac{\text{Benzene concn. of outflow}}{\text{Benzene concn. of charge}}\right) \times 100$$

$$\text{Selectivity} = \frac{\text{Amount of maleic anhydride formed (mol/h)}}{\text{Amount of benzene reacted (mol/h)}} \times 100$$

Figure 7:
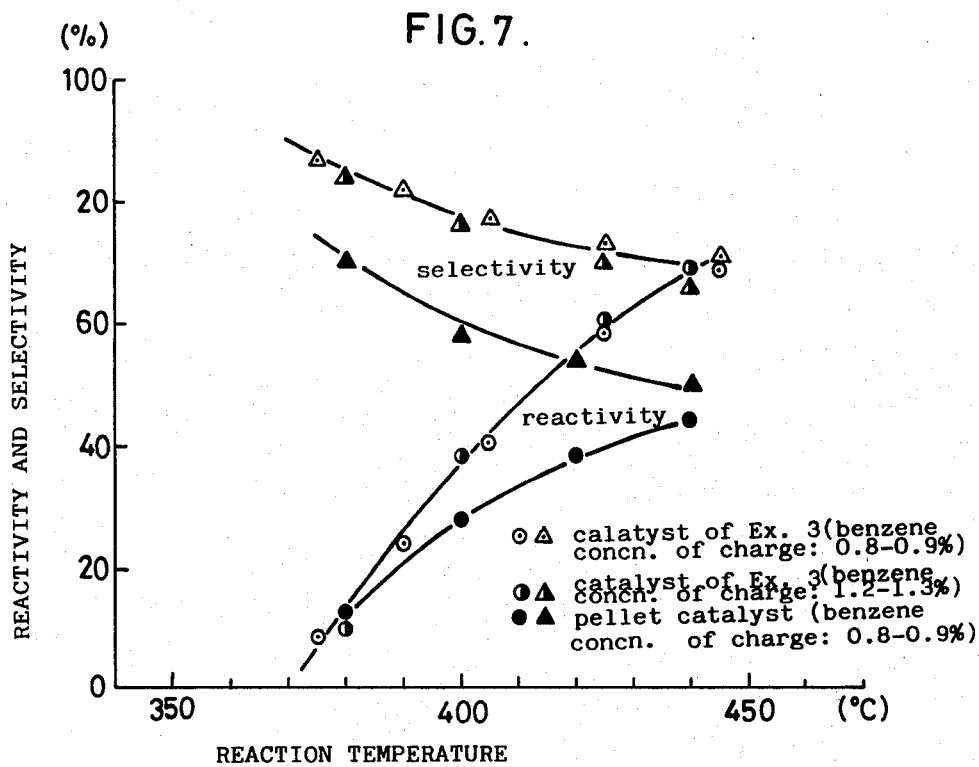
FIG. 7 is a graph showing reactivities and selectivities at varying reaction temperatures.
Figure 8:
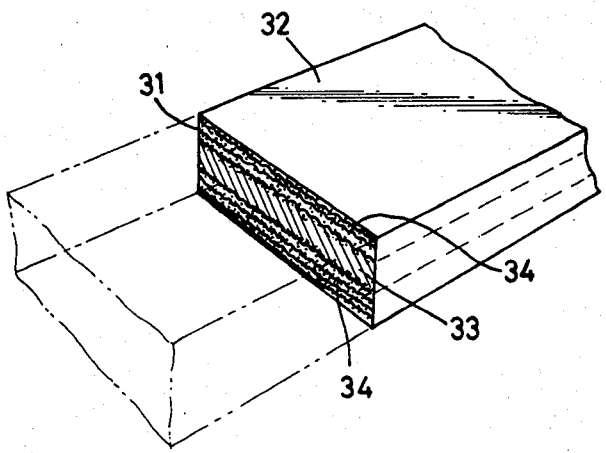
FIG. 8 is a perspective view showing a reactor.

The results are shown in FIG. 7, which reveals that the columnar catalyst structure of Example 3 is much more excellent that the pellet catalyst in both reactivity and selectivity.

EXAMPLE 4

To a slurry composed of 30 parts by weight of anatase-type TiO$_2$ particles not larger than 200 mesh and 70 parts by weight of water made acidic with sulfuric acid and having a pH of 2 to 3 was added ammonium metavanadate in an amount corresponding to 0.05 in atomic ratio relative to the TiO$_2$. The mixture was stirred at room temperature for 5 hours to dissolve the ammonium metavanadate in the slurry and cause the TiO$_2$ to adsorb the vanadate radical, affording a slurry of TiO$_2$ retaining vanadium therein. Glass roving cloth weighing 300 g/m$^2$ was immersed in the slurry and pressed with rollers twice in the slurry. The cloth thus impregnated with the slurry was attached to the opposite sides of a stainless steel plate, 50 mm×29 mm×0.3 mm, then dried at 150° C. for 1 hour and thereafter fired at 400° C. for 3 hours, whereby a catalyst structure G of the sandwich type shown in FIG. 1 was prepared.

Catalyst structures H to N were prepared in the same manner as above with the exception of using the glass fiber products shown in Table 5 in place of the glass roving cloth. The napped roving cloth was used with the nap inside.

TABLE 5

| Catalyst structure | Glass fiber product | | Number of needles/cm$^2$* |
|---|---|---|---|
| G | Roving cloth | (300 g/m$^2$) | 0 |
| H | Napped roving cloth | (300 g/m$^2$) | 162 |
| I | Napped roving cloth | (300 g/m$^2$) | 216 |
| J | Roving cloth | (570 g/m$^2$) | 0 |
| K | Napped roving cloth | (570 g/m$^2$) | 108 |
| L | Napped roving cloth | (570 g/m$^2$) | 216 |
| M | Nonwoven fabric 0.8 mm in thickness | (300 g/m$^2$) | — |
| N | Cloth, 0.2-mm-thick | (200 g/m$^2$) | — |

*The number of needles used for napping.

COMPARISON EXAMPLE

One hundred parts by weight of TiO$_2$ powder (not larger than 44µ in particle size, and 150 m$^2$/g in surface area) and 100 parts by weight of colloidal silica (containing about 20% by weight of SiO$_2$) serving as a binder were thoroughly mixed together to obtain a slurry. The slurry was applied to the opposite side of 18-mesh metal netting (30 mm×50 mm in size and made of wires, 0.5 mm in diameter, of SUS 304 steel), then dried at 100° C. for 1 hour and thereafter fired at 400° C. for 3 hours, whereby a TiO$_2$ carrier was formed on the netting in the form of a plate about 0.8 mm in thickness. The netting was immersed in a 2 N oxalic acid solution of ammonium metavanadate (1.0 mole/liter) at room temperature for 30 minutes, then withdrawn from the solution, thereafter dried at 100° C. for 1 hour and further fired at about 400° C. for 3 hours, affording a catalyst O having the catalytic component supported on the metal netting.

Activity test

Into a tubular stainless steel reactor 32 having a reactant gas flow channel 31, 6 mm×30 mm, were placed three catalyst structures 33 as arranged in a row longitudinally of the channel and supported by metal nets 34 as shown in FIG. 7. A test reaction gas having the composition shown in Table 6 was passed through the reactor 32 at a flow rate of 13 Nl/min to test the catalyst for activity to reduce NO with NH$_3$.

TABLE 6

| Component | Proportion (by volume) |
| --- | --- |
| NO | About 150 ppm |
| $NH_3$ | About 150 ppm |
| $H_2O$ | 10% |
| $CO_2$ | 10% |
| $O_2$ | 5% |
| $N_2$ | Balance |

In this way, the catalyst structures G to N and catalyst O were tested for activity at varying reaction temperatures to calculate values K defined by:

$$K = -(AV) \times \ln(1 - x)$$

where: $AV = \dfrac{\text{Flow rate of reaction gas (Nm}^3\text{/h)}}{\text{Geometric surface area of catalyst (m}^2\text{)}}$ $x$ = NO reactivity The relation between K and the amount of $TiO_2$ supported was established. Table 7 shows the results.

TABLE 7

| Catalyst structure | Amount of $TiO_2$ (g/m$^2$) | K |||| 
| --- | --- | --- | --- | --- | --- |
| | | 200° C. | 250° C. | 300° C. | 350° C. |
| G | 62 | 10.3 | 29.8 | 47.8 | 69.0 |
| H | 265 | 30.7 | 66.4 | 98.9 | 132 |
| I | 305 | 32.1 | 67.9 | 100 | 137 |
| J | 70 | 10.9 | 28.2 | 41.4 | 54.1 |
| K | 362 | 35.1 | 67.0 | 103 | 141 |
| L | 361 | 36.7 | 73.4 | 122 | 172 |
| M | 120 | 17.5 | 42.2 | 70.0 | 99.5 |
| N | 65 | 9.8 | 24.9 | 36.2 | 47.3 |
| O | 400 | 12.3 | 26.3 | 40.9 | 49.4 |

Table 7 reveals that the catalyst structures G to N of Example 4 have higher K values per unit amount of $TiO_2$ and higher activity than the catalyst O of Comparison Example.

What is claimed is:

1. A catalyst structure comprising a shape retaining metal core having a desired shape, a catalyst particle holding layer attached to the core and made of a glass fiber product having a plurality of filament-to-filament interstices, and catalyst particles held in the interstices of the holding layer.

2. A catalyst structure as defined in claim 1 wherein the particle holding layer comprises a product selected from the group consisting of glass fiber nonwoven fabric, paper, mat, cloth and roving cloth.

3. A catalyst structure as defined in claim 1 wherein the particle holding layer comprises glass fiber roving cloth napped on its inner side.

4. A catalyst structure comprising a shape retaining metal core having a desired shape, a catalyst particle holding layer attached to the core and made of a glass fiber product having a relatively large number of filament-to-filament interstices, a catalyst particle release preventing layer attached to the outer side of the holding layer and made of a glass fiber product having a relatively small number of filament-to-filament interstices, and catalyst particles held in the interstices of the holding layer.

5. A catalyst structure as defined in claim 4 wherein the holding layer comprises a glass fiber product selected from the group consisting of glass nonwoven fabric, glass paper and glass mat, and the preventing layer comprises glass cloth.

* * * * *